(12) United States Patent
Le Bleis et al.

(10) Patent No.: US 10,846,328 B2
(45) Date of Patent: Nov. 24, 2020

(54) DIGITAL ASSET ASSOCIATION WITH SEARCH QUERY DATA

(71) Applicant: Adobe Inc., San Jose, CA (US)

(72) Inventors: Guillaume Le Bleis, Créteil (FR); Sachin Soni, New Delhi (IN); Ajay Jain, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 261 days.

(21) Appl. No.: 15/599,433

(22) Filed: May 18, 2017

(65) Prior Publication Data

US 2018/0335899 A1 Nov. 22, 2018

(51) Int. Cl.
*G06F 16/58* (2019.01)
*G06F 16/538* (2019.01)
(Continued)

(52) U.S. Cl.
CPC ........ *G06F 16/5866* (2019.01); *G06F 16/156* (2019.01); *G06F 16/50* (2019.01); *G06F 16/51* (2019.01); *G06F 16/53* (2019.01); *G06F 16/538* (2019.01); *G06F 16/583* (2019.01); *G06F 16/5846* (2019.01); *G06F 21/10* (2013.01); *G06F 40/106* (2020.01); *G06F 2221/0735* (2013.01)

(58) Field of Classification Search
CPC ............. G06F 17/248; G06F 17/30017; G06F 17/30244; G06F 17/30274; G06F 17/30554; G06F 17/30572; G06F 17/30557; G06F 17/30634; G06F 17/30651; G06F 16/51; G06F 16/53; G06F 16/532; G06F 16/538; G06F 16/54; G06F 16/5866; G06F 16/156; G06F 16/22; G06F 16/2425; G06F 16/24575; G06F 16/2474; G06F 16/50; G06F 16/583; G06F 16/5846; G06F 16/433; G06F 16/434; G06F 16/60; G06F 16/77; G06F 16/783; G06F 40/106; G06F 2221/0735; G06F 21/10
See application file for complete search history.

(56) References Cited

U.S. PATENT DOCUMENTS 9,720,895 B1 * 8/2017 Warren ................ G06F 16/367
2007/0147658 A1 * 6/2007 Chiba .................... G06F 16/58
382/100

(Continued)

OTHER PUBLICATIONS

Rick Borstein, "Speed up PDF Search with an Embedded Index", Jul. 29, 2014, blogs.adobe.com, pp. 4 (Year: 2014).*

(Continued)

*Primary Examiner* — Chau T Nguyen
(74) *Attorney, Agent, or Firm* — SBMC

(57) ABSTRACT

Digital asset association techniques with search query data are described. In one example, A first digital asset is displayed at a location within digital content in a user interface. The location is specified using placeholder data of the digital content. An input is received via selection of an option as part of the user interface to initiate a search. Search query data associated with the placeholder data is obtained in response to the input. A search is initiated for a second digital asset using the search query data. The second digital asset is displayed at the location within the digital content in the user interface as specified by the placeholder data.

20 Claims, 8 Drawing Sheets

(51) Int. Cl.
*G06F 16/50* (2019.01)
*G06F 16/53* (2019.01)
*G06F 16/14* (2019.01)
*G06F 16/583* (2019.01)
*G06F 40/106* (2020.01)
*G06F 16/51* (2019.01)
*G06F 21/10* (2013.01)

(56) References Cited

U.S. PATENT DOCUMENTS

| | | | | |
|---|---|---|---|---|
| 2009/0259731 | A1* | 10/2009 | Luk | G06F 16/972 |
| | | | | 709/219 |
| 2010/0057768 | A1* | 3/2010 | Chen | G06F 16/9537 |
| | | | | 707/E17.005 |
| 2010/0082652 | A1* | 4/2010 | Jones | G06Q 30/02 |
| | | | | 707/758 |
| 2011/0184950 | A1* | 7/2011 | Skaff | G06F 16/58 |
| | | | | 707/737 |
| 2012/0266056 | A1* | 10/2012 | Shaffer | G06F 17/248 |
| | | | | 715/201 |
| 2013/0108179 | A1* | 5/2013 | Marchesotti | G06T 11/60 |
| | | | | 382/224 |
| 2013/0275411 | A1* | 10/2013 | Kim | G06F 3/04842 |
| | | | | 707/722 |
| 2014/0164890 | A1* | 6/2014 | Fox | G06F 17/2229 |
| | | | | 715/202 |
| 2014/0351287 | A1* | 11/2014 | Wolf | G06F 16/24568 |
| | | | | 707/779 |
| 2016/0140147 | A1* | 5/2016 | Sun | G06F 16/5838 |
| | | | | 707/772 |
| 2017/0052982 | A1* | 2/2017 | Sirven | G06F 16/5866 |
| 2017/0193117 | A1* | 7/2017 | Reigen | G06F 17/30867 |
| 2017/0277720 | A1* | 9/2017 | Rockefeller | G06F 16/5866 |
| 2018/0121768 | A1* | 5/2018 | Lin | G06K 9/66 |

OTHER PUBLICATIONS

Yeh et al., "A Case for Query by Image and Text Content: Searching Computer Help using Screenshots and Keywords", Mar. 28-Apr. 1, 2011, Hyderabad, India, ACM 978-4503-0632-4/11/03, pp. 10 (Year: 2011).*

* cited by examiner

DIGITAL ASSET ASSOCIATION WITH SEARCH QUERY DATA

BACKGROUND

Creative professionals, as part of creating digital content, often employ external sources to obtain additional content to be included as part of the digital content, which are referred to as digital assets in the following. A creative professional, for instance, may create a webpage (i.e., the digital content) and wish to include a digital image, multimedia, audio clip, and so forth (i.e., the digital asset). In an example in which the digital asset is a digital image, for instance, the creative professional may perform a search of a digital content sharing system (e.g., a stock image database) to locate a particular digital image of interest, e.g., as a keyword search. The creative professional may then place the digital image at a particular location within the webpage, e.g., a graphics frame.

The creative professional, or other user that may review the digital content for approval, may wish to change the digital asset within the digital content at a later point in time. A conventional workflow used to do so, however, is based on the digital image, itself, that is included as part of the digital content. Consequently, the search results are limited to digital images that are similar to the digital image placed within the digital content, and thus may depart from a context used as a basis to include the digital image as part of the digital content.

The creative professional, for instance, may first initiate a search of the digital content sharing system using search query data that includes keywords used as a basis to perform the search, e.g., "Beaches in California." Thus, in response the creative professional is exposed to a search result having different images that correspond to these keywords. The creative profession may then select a particular digital asset for inclusion as part of the digital content, e.g., depicting a sunset over a beach.

In conventional techniques, if the creative professional or other user wishes to replace that digital asset with another, the digital asset itself is used as a basis to perform a search. In this example, the search result is thus likely to include different images of a sunset over a beach and does not leverage knowledge of an original search used to locate the asset. Thus, conventional techniques are limited by a lack of availability of insight into the original search and thus may depart from a user's expectations and context in which the digital asset it to be used. These conventional techniques are also inefficient (computationally by both a client device and digital content sharing system) by forcing the creative professional or other user to repeatedly perform searches in order to locate a digital asset of interest.

SUMMARY

Digital asset techniques and systems are described in which search query data is associated with digital content that includes the digital asset. In one example, placeholder data is used to specify a location, at which, a digital asset is included within digital content (e.g., a graphics frame). Search query data that is used to locate a digital asset that is included as part of the digital content at that location is associated with the placeholder data. As a result, the search query data, and not the digital asset itself, may thus be leveraged to replace the digital asset using a search that was used to locate the digital asset. In this way, the search may be performed (e.g., by a digital content sharing system) as having increased accuracy and efficiency (e.g., computational resources of the digital content sharing system) over conventional techniques that rely, solely, on the digital asset itself.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
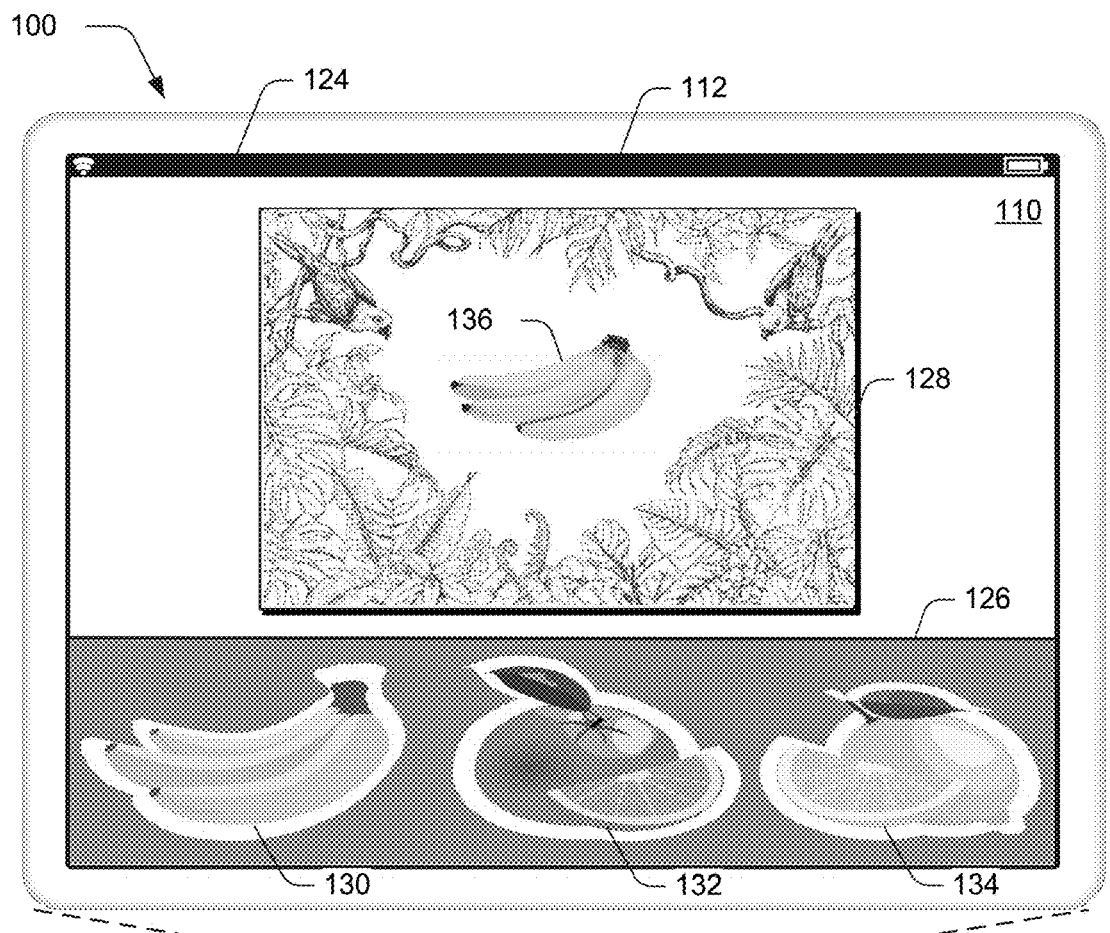
FIG. 1 is an illustration of an environment in an example implementation that is operable to employ techniques described herein.
Figure 1:
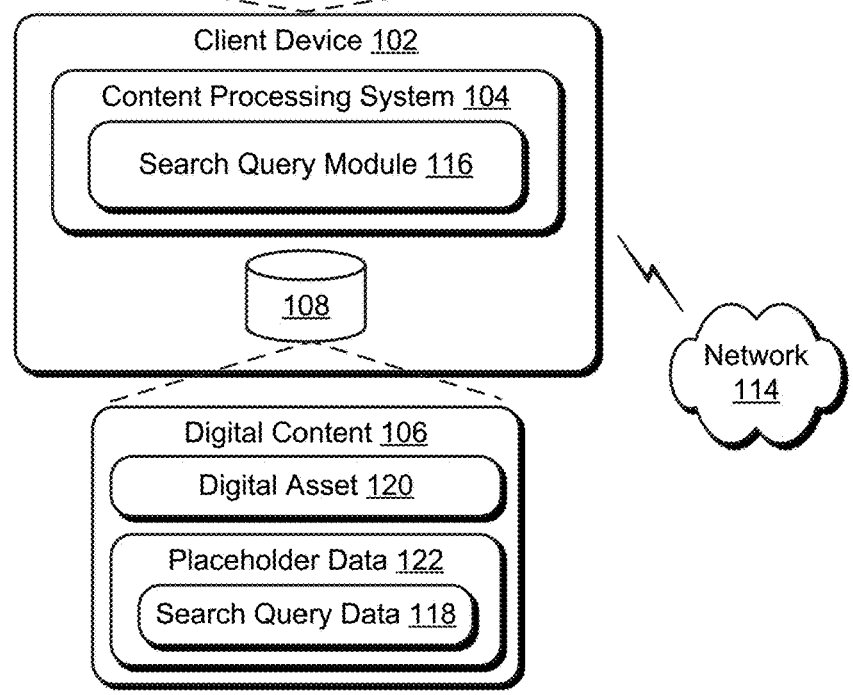

Techniques and systems are described in which search query data used to locate a digital asset is associated by a computing device with a location, at which, the digital asset is placed within digital content. This association is performed by the computing device through use of placeholder data (e.g., a graphics frame) that specifies the location within the digital content. Through use of this association, an option may be provided as part of the digital content (e.g., for output in a user interface) by the computing device to replace the digital asset with another digital asset based at least in part on the search query data. As a result, the other digital asset may be located by the computing device without forcing a user to leave a context of the digital content and corresponding user interface used to create the digital content. Further, location of the other digital asset may be performed by a digital content sharing system with increased accuracy and computational efficiency over conventional techniques that rely solely on the digital asset itself to locate similar digital assets.

A creative professional, for instance, may be tasked with creating digital content, such as a document, webpage, or other content that is capable of being stored in memory of a computing device. As part of creating this digital content, the creative professional may interact with a digital content sharing system to locate a digital asset for inclusion as part of the digital content. Digital assets may take a variety of forms, such as digital images (e.g., from a stock image database), multimedia assets, video or audio clips, and so forth. The creative professional, for instance, may initiate a keyword search using text, e.g., "Downtown Seattle", as search query data.

The digital asset is then selected from a search result obtained from the digital content sharing system by the creative professional. The creative professional, for instance, may "drag and drop" a desired digital asset from the search result and place the asset within the digital content. In response, the computing device may insert the digital asset within the digital content using placeholder data at that location, e.g., create or place the digital asset within a graphics frame. As part of this, the computing device associates the search query data used to locate the digital asset with the placeholder data of the digital content used to define the location. In this way, the search query data may be used to replace the digital asset with another digital asset as desired with increased accuracy and efficiency.

The creative professional, for instance, may then forward the digital content having the digital asset and placeholder data to a client for approval. The client, through interaction with the digital content, may view the digital content as including the digital asset. If the client wishes to make a change to the digital asset (e.g., to replace the digital asset with another), the client may interact with an option displayed in a user interface of a computing device to perform a search for another digital asset based on the search query data that is associated with the placeholder data of the digital content.

The client, for instance, may select an option to "navigate through contextual" digital assets to replace the digital asset with another digital asset located by the digital content sharing system via a search performed using the search query data. Further, this may be performed without the client even being aware of the search query data used to locate the digital asset, i.e., the actual text of the search query. As a result, the client is provided with another digital asset that has an increased likelihood of being relevant to a context in which the digital asset is to be used. Further, this may be performed to leverage digital rights management (e.g., a watermark, reduced-resolution version) to support protection of digital assets that are made available for licensing as part of these techniques. Further discussion of these and other examples is included in the following sections.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital asset search query data association techniques described herein. The illustrated environment 100 includes a client device 102, which may be configured in a variety of ways as a computing device.

A computing device, for instance, may be configured as a desktop computer, a laptop computer, a mobile device (e.g., assuming a handheld configuration such as a tablet or mobile phone as illustrated), and so forth. Thus, the client device 102, through configuration as a computing device, may range from full resource devices with substantial memory and processor resources (e.g., personal computers, game consoles) to a low-resource device with limited memory and/or processing resources (e.g., mobile devices). Additionally, although a single client device 102 is shown, the client device 102 may be representative of a plurality of different computing devices, such as multiple servers utilized by a business to perform operations "over the cloud" as described in FIG. 8.

The client device 102 is illustrated as including a content processing system 104. The content processing system 104 is implemented at least partially in hardware of the client device 102 to create, process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 may also be implemented as whole or part via functionality available via the network 114, such as part of a web service or "in the cloud," as further described in relation to FIG. 2.

Figure 8:
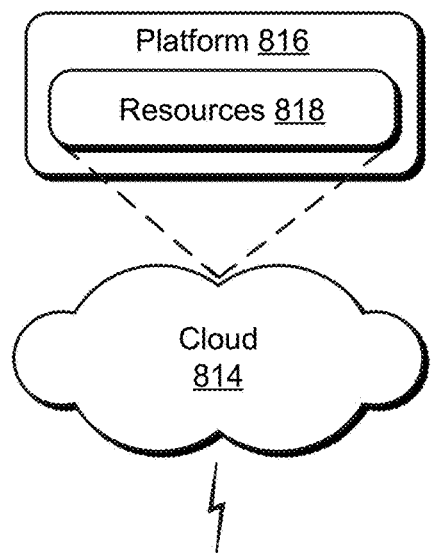
FIG. 8 illustrates an example system including various components of an example device that can be implemented as any type of computing device as described and/or utilize with reference to FIGS. 1-7 to implement embodiments of the techniques described herein.
Figure 8:
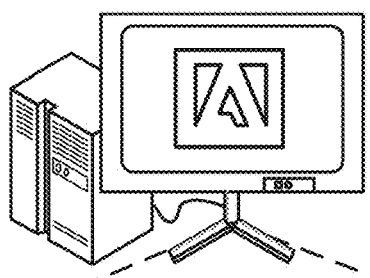
Figure 8:
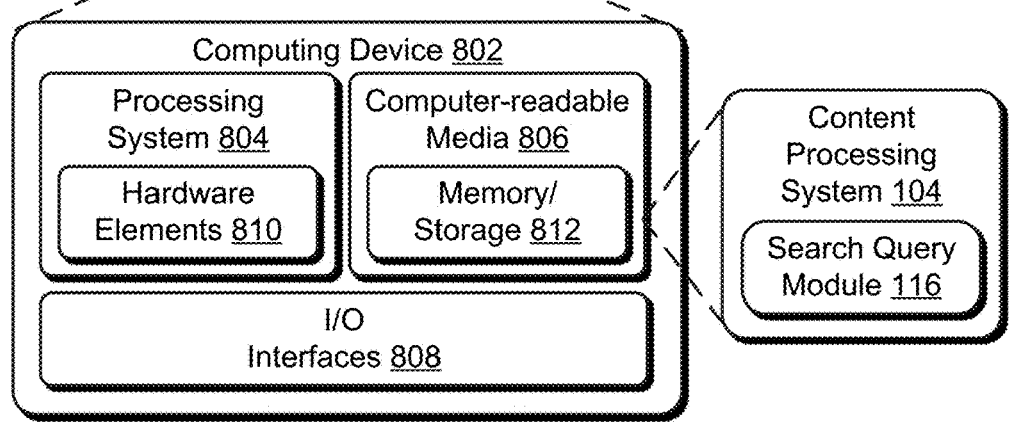

Digital content 106 may take a variety of forms that are configured to be maintained in storage 108 (e.g., a computer-readable storage medium as described in relation to FIG. 8) and rendered by a client device 102. Examples of digital content 106 include digital images, webpages, electronic documents, multimedia files, audio files, and so forth.

An example of functionality incorporated by the content processing system 104 to process the digital content 106 is illustrated as a search query module 116. The search query module 116 is configured to associate search query data 118 used to locate a digital asset 120 with placeholder data 122. As previously described, the placeholder data 122 that is used to specify a location within the digital content 106 at which the digital asset 120 it to be output.

As illustrated in the user interface 110 rendered by the display device, for instance, the user interface 110 includes a content creation portion 124 including a display of the digital content 106 and a digital asset selection portion 126. The content creation portion 124 includes a placeholder 128 that is configured to specify a particular location within a display of the digital content 106. The placeholder 128 in this instance is displayed as a graphics frame having a border. Other examples of placeholder data 122 are also contemplated, such as a frame without a visible border, tags, use of a markup language, and so forth. Thus, the placeholder data 122 may or may not include a visual indication as part of the digital content 106 when rendered.

The user interface 110 is configured such that a user may select from different examples of digital assets 130, 132, 134 for placement within the placeholder 128, e.g., to "see how it looks." An example of this is illustrated as digital asset 130 of a bunch of bananas included within a graphics frame having a jungle border. Upon selection and placement, the search query module 116 is configured to associate search query data 118 with the placeholder data 122 as part of or otherwise associated with the digital content 106, e.g., as metadata.

The search query data 118 may then be used by the search query module 116 to replace the digital asset 136 with another digital asset within a context of the search used to locate the digital asset 136. In this way, a creative professional that created the digital content 106 through interaction with the client device 102 and even other users may leverage the search query data 118 at a later point in time to obtain contextually relevant digital assets in an efficient and intuitive way. This association may be performed in a variety of environments, an example of which described as follows and shown in a corresponding figure.

Figure 2:
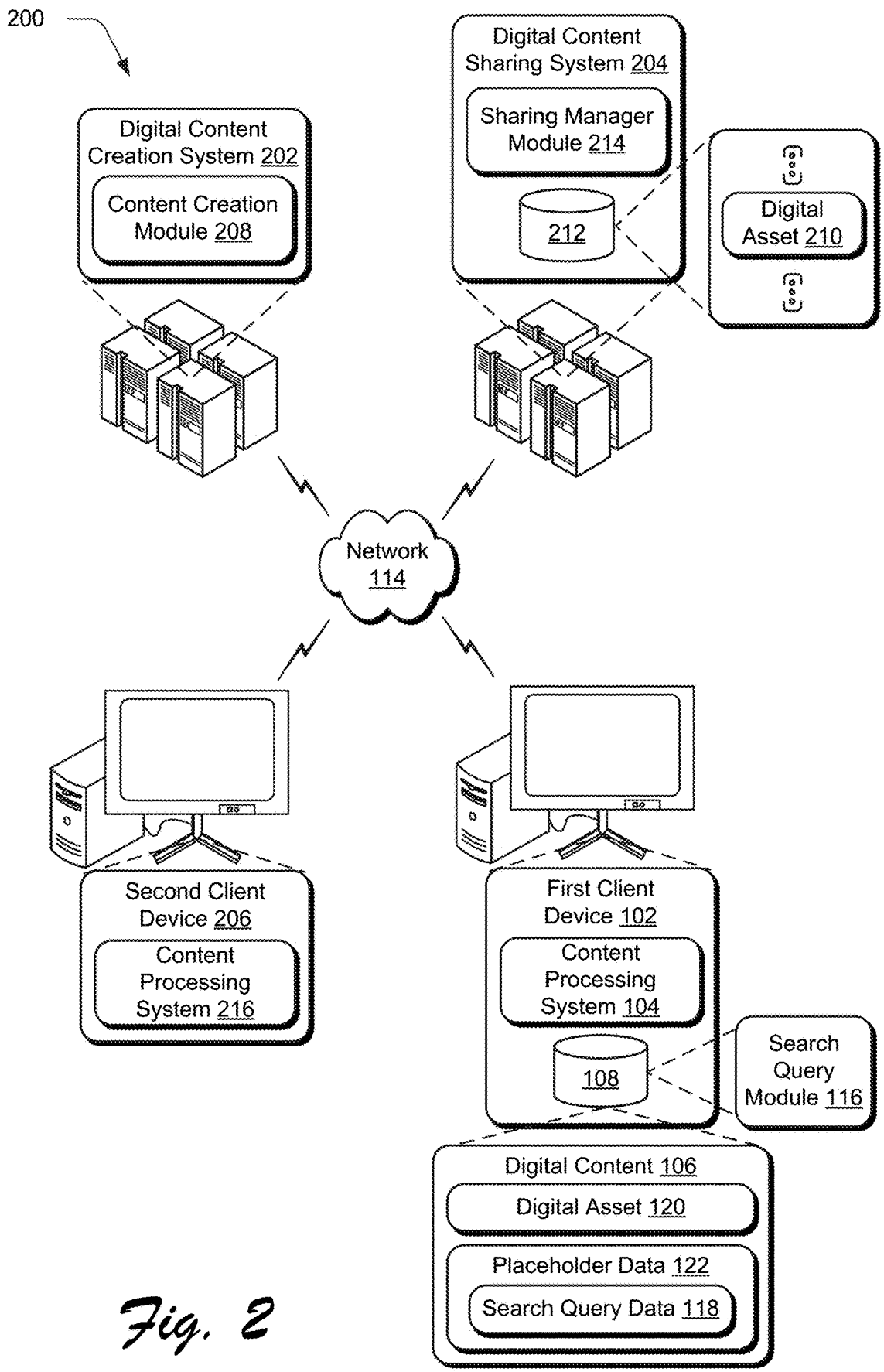
FIG. 2 depicts a digital medium environment in an example implementation in which digital asset association techniques are performed in a networked system.

FIG. 2 depicts a digital medium environment 200 in an example implementation in which digital asset association techniques are performed in a networked system. The system includes the client device of FIG. 1 as the first client device 102, a digital content creation system 202, and a digital content sharing system 204, along with a second client device 206 that are communicatively coupled, one to another, via the network 114, e.g., the Internet.

In this example, the first client device 102 is configured to create and generate the digital content 106 through interaction with a content creation module 208 of a digital content creation system 202. An example functionality implemented by such a system includes Adobe® Creative Cloud that is configured to create and transform a variety of types of digital content 106, including digital images, and so on as previously described. Other examples are also contemplated, such as incorporation of functionality of the content creation module 208 as part of the content processing system 104 locally on the first client device 102.

The digital content sharing system 204 in this example is configured to provide access to digital assets 210, which are illustrated as stored in storage 212 (e.g., a computer-readable storage medium) through interaction with a sharing manager module 214. The sharing manager module 214, for instance, may be configured to make the digital assets 210 available for licensing, e.g., in response to payment of a fee, through use of a subscription, and so forth. Accordingly, a creative professional may interact with the digital content creation system 202 to create the digital content 106 and the digital content sharing system 204 (e.g., directly or indirectly through the digital content creation system 202) to obtain a digital asset 120 for inclusion as part of the digital content 106.

When included, the search query module 116 is configured to associate search query data 118 used to locate the digital asset 120 by the digital content sharing system 204 with placeholder data 122 that specifies a location within the digital content 106. Further discussion of association of the search query data 118 as part of the placeholder data is described in a corresponding section in the following discussion and in relation to FIGS. 3 and 4. Further discussion of use of the associated search query data 118 is described in a corresponding section in the following discussion and in relation to FIGS. 5-7.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Search Query Data Association with Placeholder Data

Figure 3:
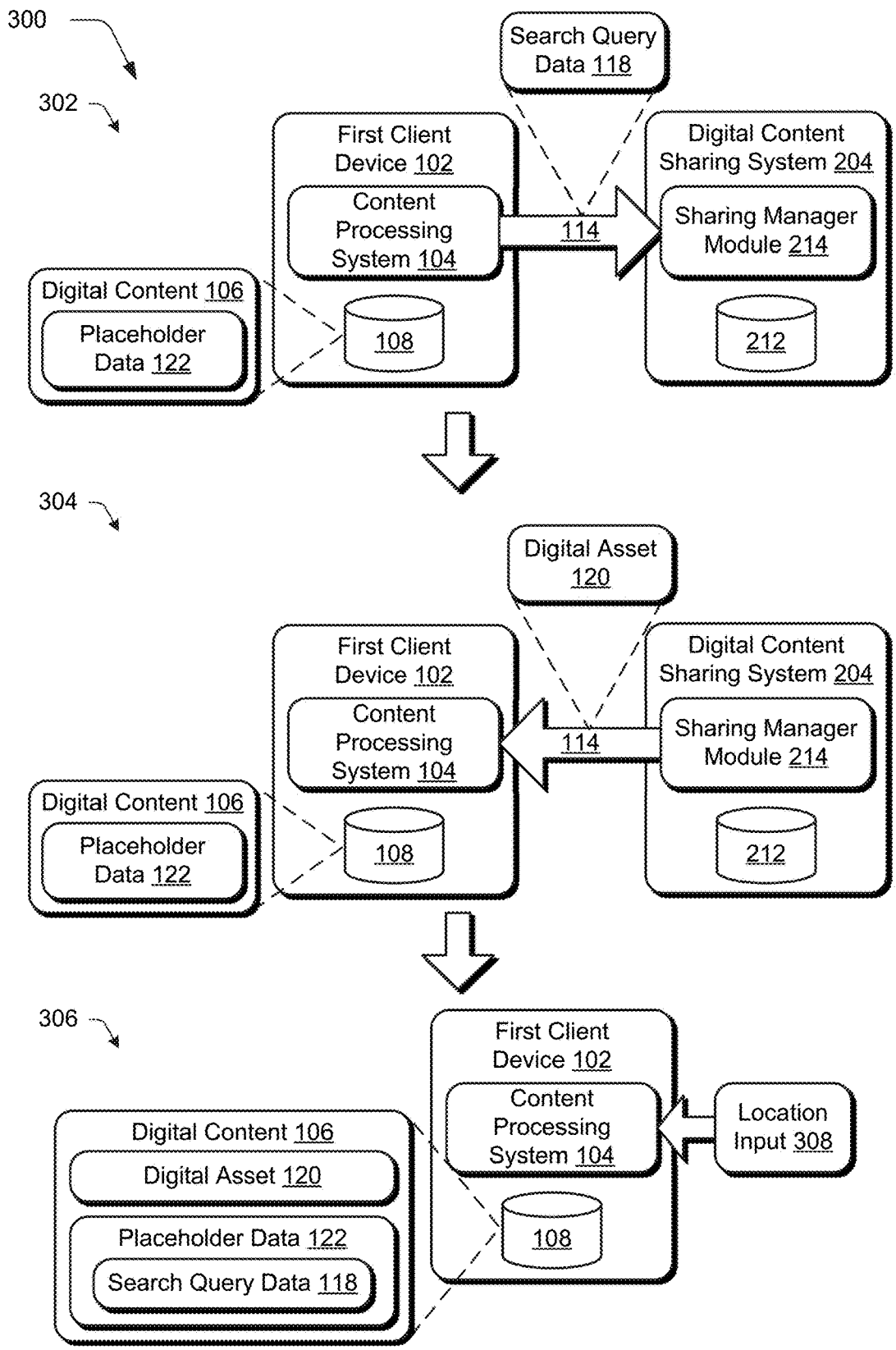
FIG. 3 depicts a system in an example implementation in which search query data is associated with placeholder data that is part of digital content as part of the digital medium environment of FIG. 2.
Figure 4:
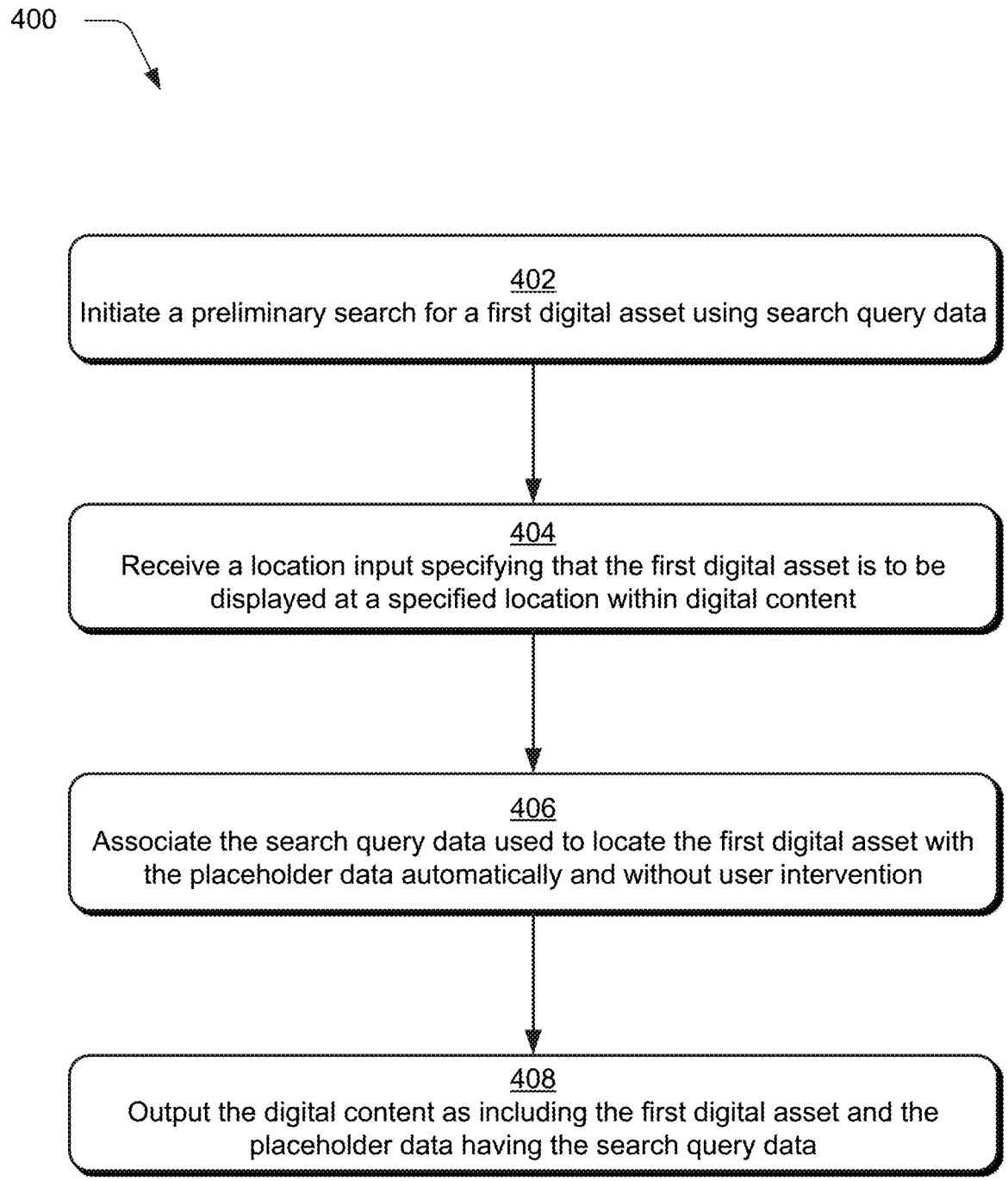
FIG. 4 is a flow diagram depicting a procedure in an example implementation of search query data association with placeholder data of digital content.

FIG. 3 depicts a system 300 in an example implementation in which search query data is associated with placeholder data that is part of digital content as part of the digital medium environment 200 of FIG. 2. FIG. 4 depicts a procedure 400 in an example implementation of search query data association with placeholder data of digital content. FIG. 3 is illustrated using first, second and third stages 320, 304, 306.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-4.

A preliminary search is initiated for a first digital asset using search query data (block 402). A creative professional, for instance, may interact with a user interface output by the content processing system 104 to create digital content 106. This may be performed locally at the first client device 102 or remotely, at least in part, through interaction with a digital content creation system 202. As part of this interaction, search query data 118 is received as an input by the content processing system 104 to locate a digital asset 120 of interest.

As illustrated at the first stage 302, for instance, the search query data 118 (e.g., keywords such as "California Beach") is communicated by the content processing system 104 via the network 114 to the sharing manager module 214 of the digital content sharing system 204. This may be performed directly between the first client device 102 and the digital content sharing system 204 or indirectly through use of the digital content creation system 202 and an intermediary.

At the second stage 304, the sharing manager module 214 locates the digital asset 120 as corresponding to the search query data 118. The sharing manager module 214 then configures a search result that includes the digital asset 120 for communication back to the first client device 102, e.g., singly or as part of a search result having multiple digital assets as available for selection.

The digital asset 120 returned by the digital content sharing system 204 is configurable in a variety of ways. In one example, the digital asset 120 is a "full version", e.g., has high resolution and is fully enabled for use. In another example, the digital asset 120 is protected using digital rights management (e.g., a watermark, low-resolution version) until licensed for use from the digital content sharing system 302, e.g., through user credentials. In this other example, the digital asset 120 may thus act as a "preview" for use without obtaining a license and thus provides increased functionality without additional cost until licensing and use is desired.

As shown at the third stage 306, upon receipt of the digital asset 120, a location input 308 is received by the first client device 102 specifying that the first digital asset is to be displayed at a specified location within digital content (block 404). The location input 308, for instance, may specify that the digital asset 120 is to be placed within a graphics frame defined by the placeholder data 122. This may be specified by dragging the digital asset 120 to the location within a user interface, through use of a "cut and paste" operation, and so forth.

In response, the search query data 118 used to locate the first digital asset 120 is associated with placeholder data 122 automatically and without user intervention (block 406) by the content processing system 104, e.g., the search query module 116. The search query module 116, for instance, may identify that the location input 308 specifies a link between the digital asset 120 and a location within the digital content 106. If placeholder data 122 is already generated that identifies the location, the search query data 118 is associated (i.e., linked) with the placeholder data 122, e.g., as part of metadata of the digital content 106. If placeholder data 122 is not already available, the placeholder data 122 may be generated and then linked to create the association.

The digital content is then output as including the first digital asset and the placeholder data having the search query data (block 408). The search query data 118, through association with the placeholder data 122, may then be used to facilitate replacement of the digital asset 120 with another digital asset, an example of which is described in the following section and shown in corresponding figures.

Use of an Association of Search Query Data with Placeholder Data

Figure 5:
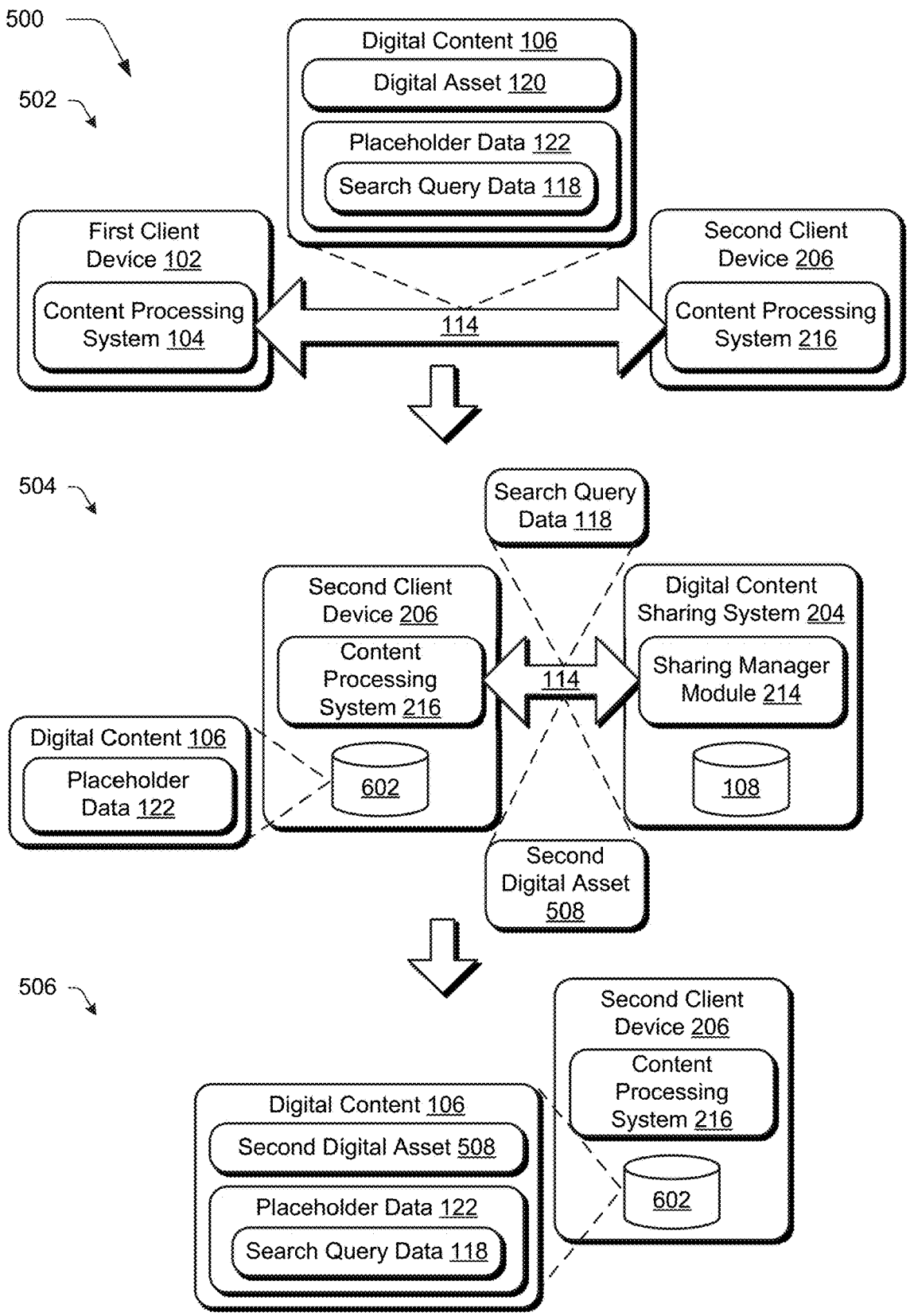
FIG. 5 depicts a system in an example implementation in which search query data associated with placeholder data is used to initiate a search for another digital asset.
Figure 6:
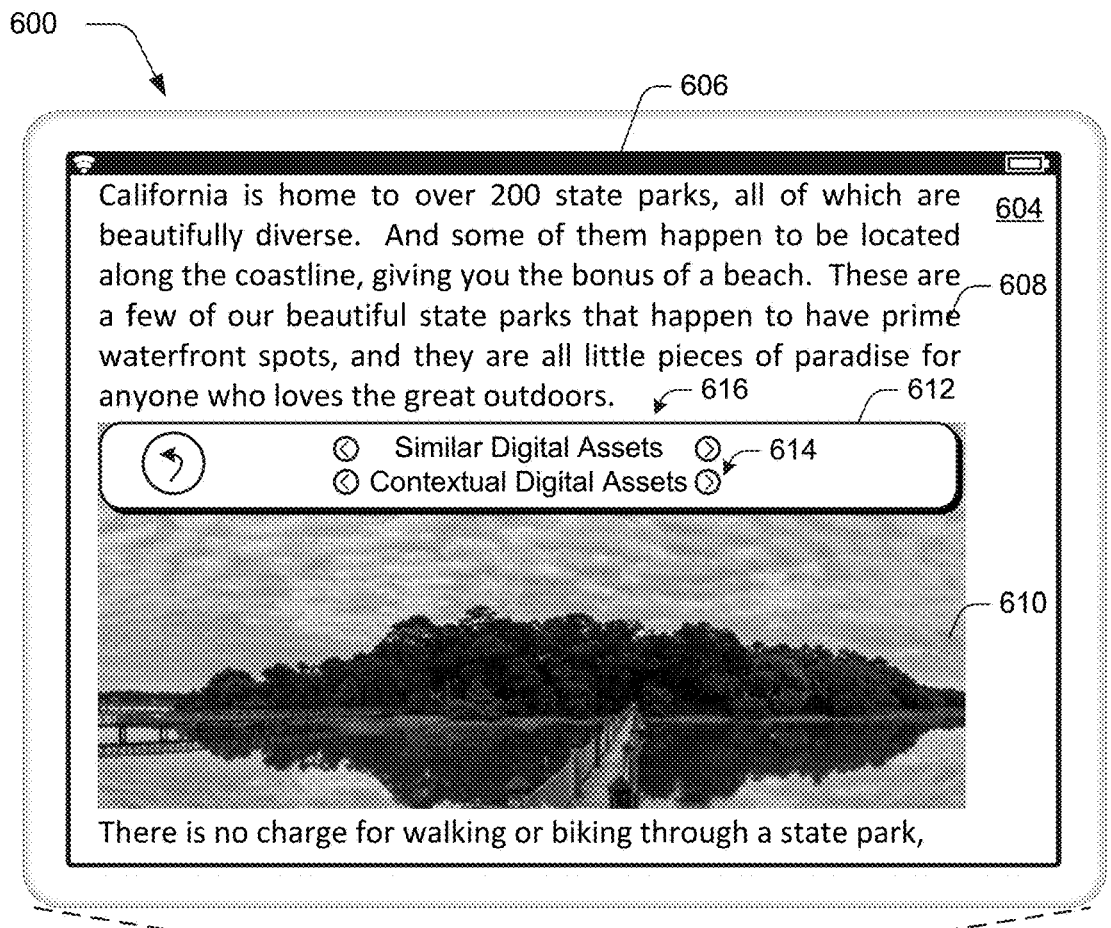
FIG. 6 depicts an example user interface as including an option to initiate a contextual search for digital assets.
Figure 6:
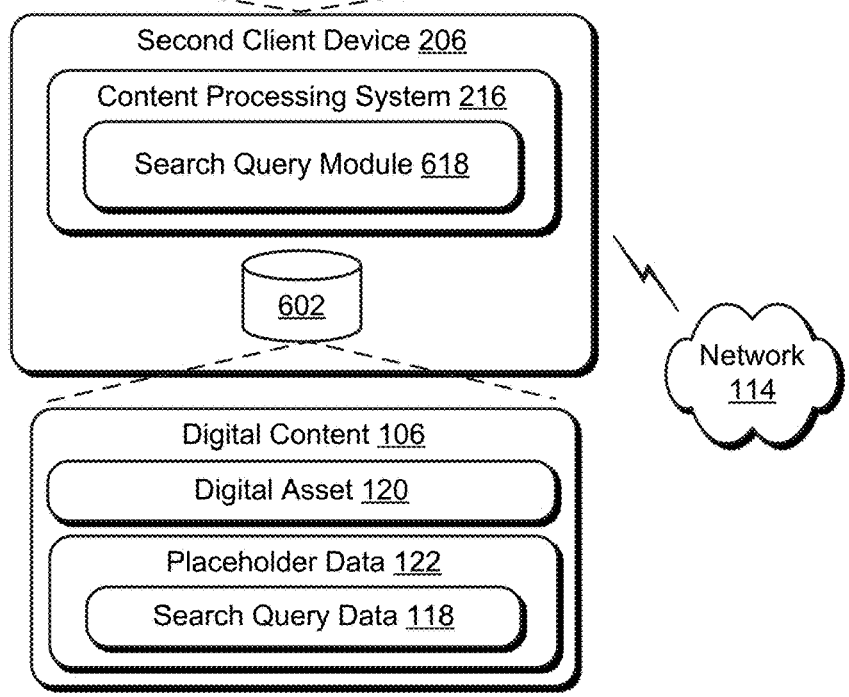
Figure 7:
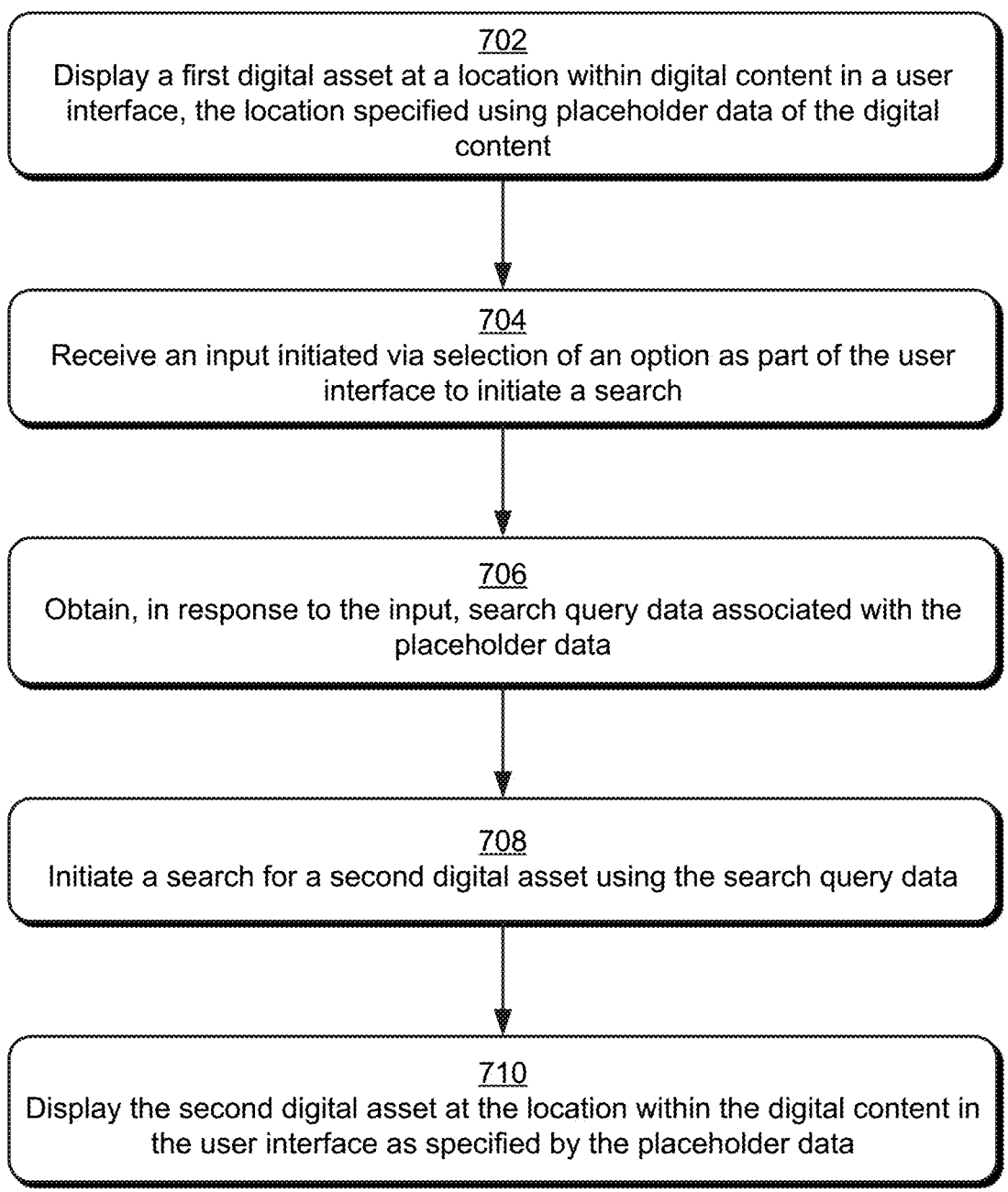
FIG. 7 is a flow diagram depicting a procedure in an example implementation of use of search query data that is associated with placeholder data as part of digital content.

FIG. 5 depicts a system 500 in an example implementation in which search query data associated with placeholder data is used to initiate a search for another digital asset. FIG. 6 depicts an example implementation 600 of a user interface as including an option to initiate a contextual search for digital assets. FIG. 7 depicts a procedure 700 in an example implementation of use of search query data that is associated with placeholder data as part of digital content. FIG. 5 is illustrated using first, second and third stages 502, 504, 506.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 5-7.

To begin in this example as shown at the first stage 502, the first client device 102 communicates the digital content 106 having the digital asset 120, placeholder data 122, and associated search query data 118 via the network 114 to the second client device 206. Other examples are also contemplated, e.g., in which the digital content 106 remains on the first client device.

A first digital asset (e.g., digital asset 120) is displayed at a location within digital content in a user interface. The location is specified using placeholder data 122 of the digital content 106 (block 702). As shown in the example user interface 604 of FIG. 6, for instance, the digital content 106 is illustrated as stored in storage 602 and rendered on a display device 606. The digital content 106, as rendered, includes a text portion 608 as well as a graphics frames (not visible) having a rendered result 610 of the digital asset 120. The location of the digital asset 120, when rendered by the content processing system 216 of the second client device 206, is specified by placeholder data 122, e.g., as a graphics frame, tag, markup, and so forth.

An input is received via selection of an option 612 as part of the user interface 604 to initiate a search (block 704). A user, for instance, may hover a cursor, finger, and so forth over or proximal to the location of the rendered result 610 of the digital asset 120. In response, the search query module 618 (functionality of which may be incorporated as part of the digital content 106 itself) causes output of the option 612.

The option 612 includes a selectable portion 614 (e.g., gesture, keyboard combination, cursor, utterance) to initiate a search of other digital assets that are contextual to the digital asset 120 through use of the search query data 118. The option 612 also includes a selectable portion 616 to initiate a search of digital assets that are similar to the digital asset 120, e.g., an image search based on the digital asset 120 itself and not the search query data 118. In an implementation, both may also be used, e.g., the search query data 118 and the digital asset 120 as part of an image search.

In the illustrated example, an input is received in relation to the selectable portion 614 to initiate a contextual search of digital assets. In response, search query data 118 associated with the placeholder data 122 is obtained in response to the input (block 706) by the search query module 608. A search is then is initiated for a second digital asset using the search query data (block 708). The search query data 118, which was originally used to locate the digital asset 120, is now communicated to the digital content sharing system 204 to locate a second digital asset 508 having the same "context" as the first digital asset. In this way, the contextual search may support "what is meant to be conveyed" by the digital asset 120 and the second digital asset 508 as opposed to image similarity of the images. The second digital asset 508, as a result of the search by the sharing manager module 214, is communicated over the network 114 to the second client device 206.

The second digital asset is displayed at the location within the digital content in the user interface as specified by the placeholder data (block 710), as shown at the third stage 506. Returning again to FIG. 6, the second digital asset may be used to replace the rendered result 610 of the digital asset 120 in the user interface 604. In this way, a user may quickly navigate through different digital asset options to locate a desired asset of interest while remaining within a context of the user interface 604. In other words, i.e., the user interface 604 remains displayed during the above described operations and thus is "non-modal" and does not require the user to navigate away to interact with different user interfaces as required in conventional techniques.

Further, the techniques described herein may leverage digital rights management functionality, such as to protect digital assets that have not been licensed but are available for licensing. For example, the digital assets 120, 508 may be configured as previews of a "full" version of the asset, e.g., protected using a watermark, as a down-sampled version, and so on. These previews may also include options that may be selected by a user to license the digital asset, when desired. Thus, a creative professional may "try out" different digital assets within digital content 106 and share the digital content 106 with others to select a digital asset that is then licensed for inclusion as part of the digital content 106. In this way, the creative professional as well as the digital content sharing system 204 and digital content creation system 202 may expose a greater range of functionality over conventional techniques, e.g., that require licensing before interaction.

Example System and Device

FIG. 8 illustrates an example system generally at 800 that includes an example computing device 802 that is representative of one or more computing systems and/or devices that may implement the various techniques described herein. This is illustrated through inclusion of the content processing system 104 and search query module 116. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by at least one computing device, the method comprising:
   displaying, by the at least one computing device, a first digital asset at a location within digital content in a user interface, the location specified using placeholder data of the digital content, the placeholder data also including search query data having text used for locating the first digital asset as part of a first keyword search;
   receiving, by the at least one computing device, an input initiated via selection of an option as part of the user interface to initiate a second keyword search;
   obtaining, by the at least one computing device in response to the input, the text of the search query data associated with the placeholder data;
   initiating, by the at least one computing device in response to the input, the second keyword search for a second digital asset using the text of the search query data from the placeholder data of the digital content; and
   replacing, by the at least one computing device responsive to the second keyword search, the display of the first digital asset at the location within the digital content in the user interface with a display of the second digital asset at the location within the digital content in the user interface as specified by the placeholder data.

2. The method as described in claim 1, wherein the placeholder data specifies a graphics frame, in which, the first and second digital assets are displayed within the digital content.

3. The method as described in claim 1, wherein the displaying of the first digital asset, the receiving, the obtaining, the initiating, and the displaying of the second digital asset are each performed without leaving display of the user interface.

4. The method as described in claim 1, further comprising:
   initiating, by the at least one computing device, the first keyword search for the first digital asset using the text of the search query data;
   receiving, by the at least one computing device, a location input specifying that the first digital asset is to be displayed at the specified location within the digital content; and
   associating, by the at least one computing device in response to the location input, the text of the search query data used to locate the first digital asset with the placeholder data automatically and without user intervention.

5. The method as described in claim 1, wherein the displaying of the second digital asset includes an option to obtain a license for use of the second digital asset.

6. The method as described in claim 5, wherein the displaying of the second digital asset, without the license, is protected using digital rights management.

7. The method as described in claim 1, wherein the search query data is text used as part of the first keyword search of tags associated with a plurality of digital assets to locate the first digital asset.

8. The method as described in claim 1, wherein the first and second digital assets are digital images.

9. At least one non-transitory computer-readable storage media having instructions stored thereon that, responsive to execution by at least one computing device, causes the at least one computing device to perform operations comprising:
   receiving a first digital asset in response to a first keyword search performed based on text included in search query data;
   receiving an input specifying a location within digital content at which the first digital asset is to be placed;
   generating placeholder data, responsive to the input, that identifies:
   the specified location at which the first digital asset is to be placed; and
   the text included in the search query data used as part of the first keyword search; and
   storing the placeholder data as part of the digital content, responsive to the input, such that the first keyword search is repeatable using the text of the search query data to initiate a second keyword search using the text of the search query data from the placeholder data of the digital content for a second digital asset to replace the first digital asset.

10. The at least one non-transitory computer-readable storage media of claim 9, wherein the placeholder data specifies a graphics frame, in which, the first and second digital assets are displayed within the digital content.

11. The at least one non-transitory computer-readable storage media of claim 9, wherein the search query data is text used as part of the first keyword search of tags associated with a plurality of digital assets to locate the first digital asset.

12. The at least one non-transitory computer-readable storage media of claim 9, wherein the first and second digital assets are a digital images.

13. In a digital medium environment, a system comprising:
   means for displaying a first digital asset at a location within digital content in a user interface, the location specified using placeholder data of the digital content, the placeholder data also including search query data having text for locating the first digital asset as part of a first keyword search;
   means for receiving an input initiated via selection of an option as part of the user interface to initiate a second keyword search;
   means for obtaining the text of the search query data associated with the placeholder data responsive to the input;
   means for initiating the second keyword search for a second digital asset using the text of the search query data from the placeholder data of the digital content responsive to the input; and
   means for replacing the first digital asset, responsive to the initiating means at the location with the second digital asset at the location within the digital content in the user interface as specified by the placeholder data.

14. The system as described in claim 13, wherein the placeholder data specifies a graphics frame, in which, the first and second digital assets are displayed within the digital content.

15. The system as described in claim 13, further comprising:
   means for initiating the first keyword search for the first digital asset using the text of the search query data;
   means for receiving a location input specifying that the first digital asset is to be displayed at the specified location within the digital content; and
   means for associating, in response to the location input, the text of the search query data used to locate the first digital asset with the placeholder data automatically and without user intervention.

16. The system as described in claim 13, wherein display of the second digital asset includes an option to obtain a license for use of the second digital asset.

17. The system as described in claim 13, wherein display of the second digital asset, without the license, is protected using digital rights management.

18. The system as described in claim 13, wherein the search query data is text used as part of the first keyword search of tags associated with a plurality of digital assets to locate the first digital asset.

19. The system as described in claim 13, wherein the placeholder data specifies a graphics frame, in which, the first and second digital assets are displayed within the digital content.

20. The system as described in claim 13, wherein the first and second digital assets are digital images.

* * * * *